United States Patent
Lindner

(10) Patent No.: US 11,696,616 B2
(45) Date of Patent: Jul. 11, 2023

(54) DANCING SHOE, SOLE/TOE UNIT, UPPER SHOE, AND KIT CONSISTING OF A SOLE OR A SOLE/TOE UNIT AND AN UPPER SHOE

(71) Applicant: Sophia Lindner, Karlsruhe (DE)

(72) Inventor: Sophia Lindner, Karlsruhe (DE)

( * ) Notice: Subject to any disclaimer, the term of this patent is extended or adjusted under 35 U.S.C. 154(b) by 0 days.

(21) Appl. No.: 16/765,467

(22) PCT Filed: May 28, 2019

(86) PCT No.: PCT/EP2019/063769
§ 371 (c)(1),
(2) Date: May 19, 2020

(87) PCT Pub. No.: WO2019/229043
PCT Pub. Date: Dec. 5, 2019

(65) Prior Publication Data
US 2020/0275734 A1    Sep. 3, 2020

(30) Foreign Application Priority Data

May 30, 2018    (DE) ..................... 10 2018 112 942.4

(51) Int. Cl.
| | |
|---|---|
| A43B 5/12 | (2006.01) |
| A43B 13/14 | (2006.01) |
| A43B 3/24 | (2006.01) |
| A43B 13/12 | (2006.01) |

(Continued)

(52) U.S. Cl.
CPC .............. *A43B 5/12* (2013.01); *A43B 13/141* (2013.01); *A43B 3/244* (2013.01); *A43B 13/12* (2013.01); *A43B 13/16* (2013.01); *B29C 64/00* (2017.08)

(58) Field of Classification Search
CPC .. A43B 5/12; A43B 3/244; A43B 1/04; A43B 13/36; A43B 3/128; A43B 3/12; A43B 5/18; A43B 3/16; A43C 15/02
See application file for complete search history.

(56) References Cited

U.S. PATENT DOCUMENTS

| | | | | |
|---|---|---|---|---|
| 1,382,748 A | * | 6/1921 | Slasor ...................... | A43B 3/20 36/72 R |
| 2,575,752 A | * | 11/1951 | Dotzenroth ............ | A43B 21/22 36/70 R |
| 4,901,453 A | | 2/1990 | Gaynor | |

(Continued)

FOREIGN PATENT DOCUMENTS

| | | |
|---|---|---|
| DE | 420613 C | 10/1925 |
| DE | 530701 C | 7/1931 |

(Continued)

*Primary Examiner* — Sharon M Prange
*Assistant Examiner* — Grady Alexander Nunnery
(74) *Attorney, Agent, or Firm* — Rabin & Berdo, P.C.

(57) ABSTRACT

A dancing shoe is described. The latter has a sole with an inner side and an outer side, which sole extends in a longitudinal direction from a rear end to a front end. The outer side of the sole has a plurality of incisions. Moreover, an upper shoe is provided, which is connected to the sole and has a foot section. To connect the upper shoe to the sole, the foot section of the upper shoe has, on its underside, at least one recess through which elongate connection elements extend which, in the state when the dancing shoe is being worn, are received at least in some regions in incisions of the outer side of the sole.

24 Claims, 5 Drawing Sheets

Figure 1:
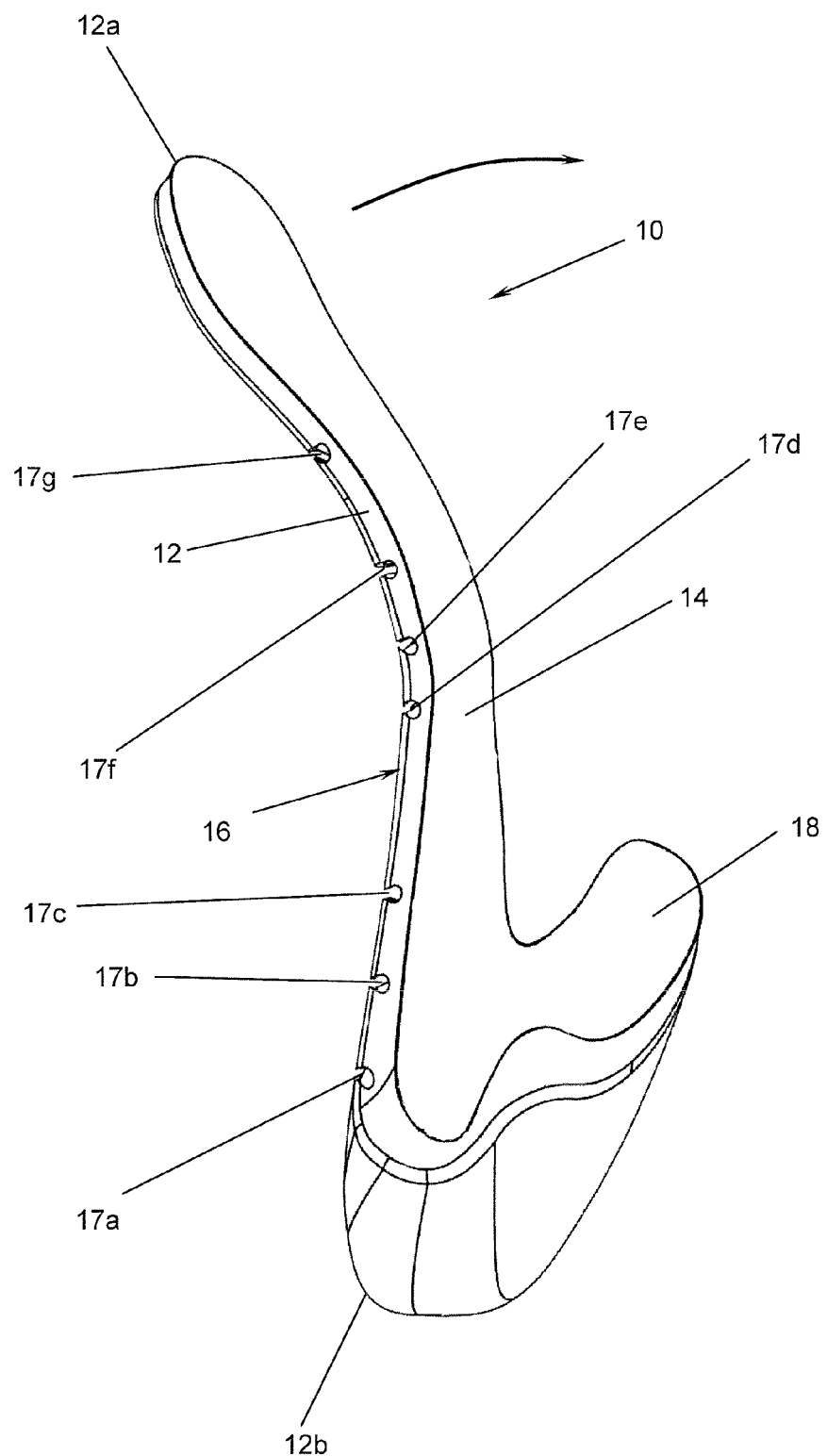

(51) Int. Cl.
*A43B 13/16* (2006.01)
*B29C 64/00* (2017.01)

(56) References Cited

U.S. PATENT DOCUMENTS

| | | | |
|---|---|---|---|
| 6,272,772 B1* | 8/2001 | Sherman | A43C 11/14 36/89 |
| 6,931,762 B1* | 8/2005 | Dua | A43B 1/04 12/142 G |
| 8,082,682 B2 | 12/2011 | Karl et al. | |
| 8,832,863 B2 | 9/2014 | Yang | |
| 9,314,068 B2* | 4/2016 | Schmutte | A43B 23/086 |
| 10,743,608 B2* | 8/2020 | Ghiotti | A43B 13/14 |
| 2002/0166257 A1* | 11/2002 | Wilkinson | A43B 7/12 36/3 A |
| 2005/0022421 A1 | 2/2005 | Bruckner | |
| 2007/0289165 A1* | 12/2007 | Sartor | A43B 23/086 36/77 R |
| 2009/0055997 A1* | 3/2009 | Kaplan-Sirota | A43B 3/24 2/272 |
| 2010/0126042 A1 | 5/2010 | Wyon | |
| 2011/0094128 A1* | 4/2011 | Lagrand | A43C 15/10 36/67 A |
| 2013/0104424 A1* | 5/2013 | Quain | A43B 3/102 36/103 |
| 2013/0118037 A1 | 5/2013 | Bathum et al. | |
| 2015/0342297 A1* | 12/2015 | Garza, Jr. | A63B 23/1209 482/122 |
| 2015/0374063 A1* | 12/2015 | Jurgeto | A43B 3/0031 36/72 R |
| 2016/0242505 A1* | 8/2016 | Waatti | A43B 3/244 |

FOREIGN PATENT DOCUMENTS

| | | |
|---|---|---|
| DE | 2736974 A1 | 3/1979 |
| DE | 3524676 A1 | 1/1987 |
| DE | 202621 B1 | 6/1990 |
| DE | 202011004126 U1 | 6/2011 |
| EP | 0997081 A1 | 5/2000 |
| EP | 1954154 B1 | 9/2015 |
| EP | 2742818 B1 | 1/2017 |
| GB | 2156652 A | 10/1985 |
| GB | 2245813 A | 1/1992 |
| GB | 2550880 A | 12/2017 |

\* cited by examiner

2

DANCING SHOE, SOLE/TOE UNIT, UPPER SHOE, AND KIT CONSISTING OF A SOLE OR A SOLE/TOE UNIT AND AN UPPER SHOE

The invention relates to a dance shoe, a sole/toe unit, an upper shoe and a kit composed of a sole or a sole/toe unit and an upper shoe.

Dance shoes, in particular pointe dance shoes for the classical ballet dance, have been known for some time. The invention relates in particular to those types of dance shoes, but can also be used for other types of dance shoes. In the following, we initially only refer to pointe dance shoes.

From a functional point of view, these types of dance shoes—frequently also called ballet shoes—consist of a sole extending from a back end to a front end, a toe box connected thereto in the region of the front end, as well as a textile upper shoe that is connected to the sole and toe box and also includes straps or laces for tying. To this day, dance shoes of this type are primarily manufactured individually with mechanical methods and are correspondingly expensive. This is of particular importance since professional male/female dancers wear out one to two pairs of ballet shoes per year.

Another problem with ballet shoes is that they must frequently be reworked by the male/female user, so that they can be worn at all.

Finally, a general problem with ballet dancing and especially the classical ballet dancing is the extremely high stress on the feet, which frequently leads to permanent damage to the feet.

From the generic U.S. Pat. No. 8,082,682 B2, for example, it is known that to make the sole of a shoe more flexible, the outside of the sole is provided with incisions taking the form of grooves that extend transverse to the longitudinal extension of the sole.

Starting therefrom, it is the object of the present invention to make available a dance shoe which at least contributes to an improvement regarding the above-described problem.

This object is solved with a dance shoe, and a kit consisting of a sole or a sole/toe unit along with an upper shoe, having the features as disclosed in one or more of the claims.

The basic idea behind the invention is to produce the sole and the upper shoe separately, such that they are connected only in the state when they are worn. For this, the upper shoe has a foot section with an underside that contains at least one recess. Elongated connecting elements extend through this recess which, when the shoe is worn, are accommodated at least in some sections in incisions on the outside of the sole. At least two and in particular at least four such connecting elements are preferably provided. As a result, a sufficiently strong, but detachable, connection is created between sole and upper shoe when the shoe is worn. The upper shoe in this case preferably consists at least in some parts of an elastic material. This type of design results in numerous advantages.

On the one hand, the process of producing the dance shoe is simplified in that the step of connecting the sole and to the upper shoe is omitted.

If a sole is worn out, the upper shoe can furthermore be used with a new sole.

The upper shoe preferably is embodied in the form of a stocking and has a leg section in addition to the foot section. Such a stocking-type design of the upper shoe can be adapted to the requirements of the male/female dancer, particularly since it has regions of differing elasticity and/or stiffness. On the whole, this also results in a better hold for the foot, thus reducing the stress for the male/female dancer. For these reasons, a ballet shoe according to the invention, for which the upper shoe is designed as a stocking, is definitely preferable for use during the training. For dancing performances, it may be preferable in some cases to use an upper shoe without the leg segment.

As mentioned, one preferred exemplary use of the invention is for a pointe dance shoe, which furthermore has a dimensionally stable toe box. The latter is preferably formed in that a toe unit adjoins the sole, wherein it is preferable if the toe unit is integrally connected to the sole, so as to form a sole/toe unit. A toe protection insert is advantageously arranged inside the toe unit. This insert can be manufactured separately, in particular so as to be adapted to the front foot of the male/female dancer.

Preferred embodiments and further advantages follow from the dependent claims as well as the exemplary embodiment, shown in further detail with reference to the Figures.

Figure 2:
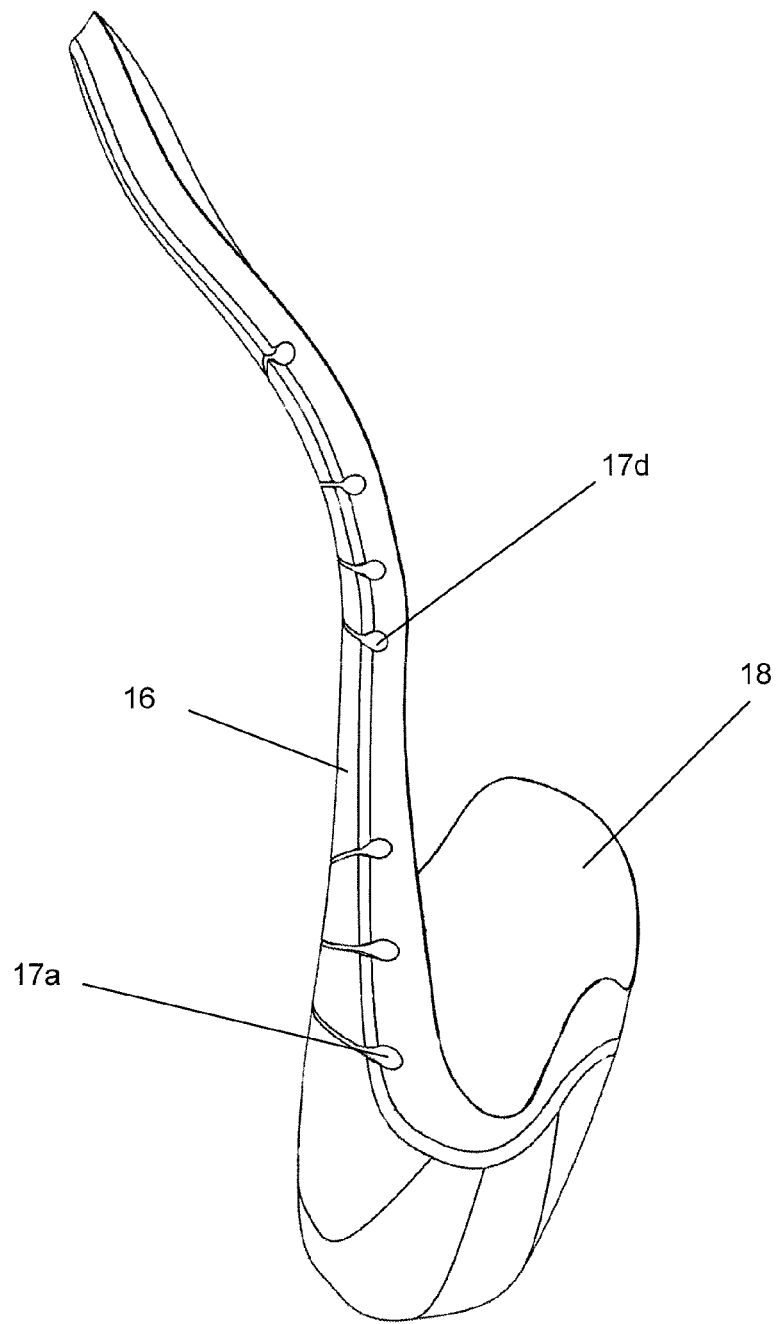
Figure 3:
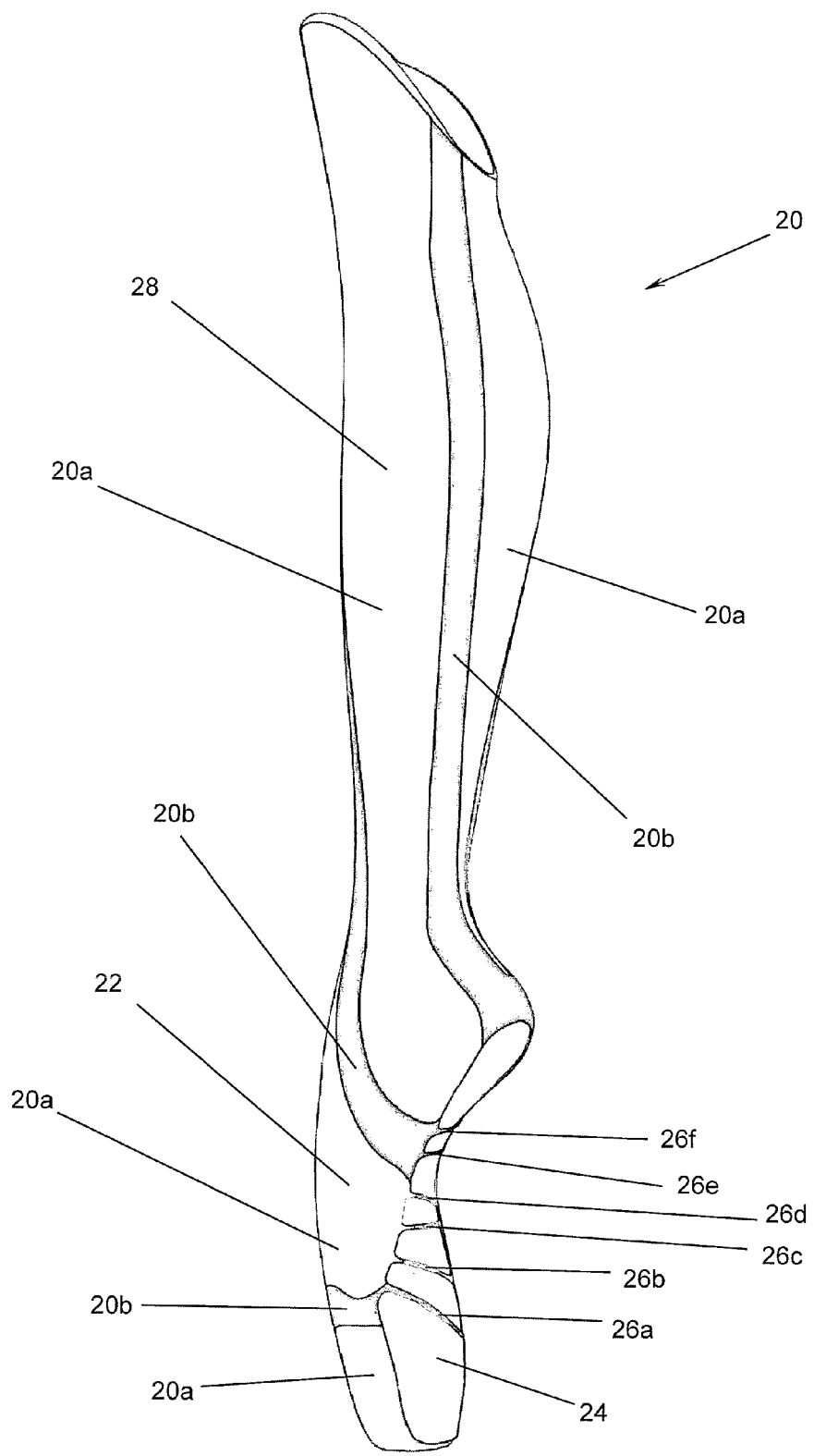
Figure 4:
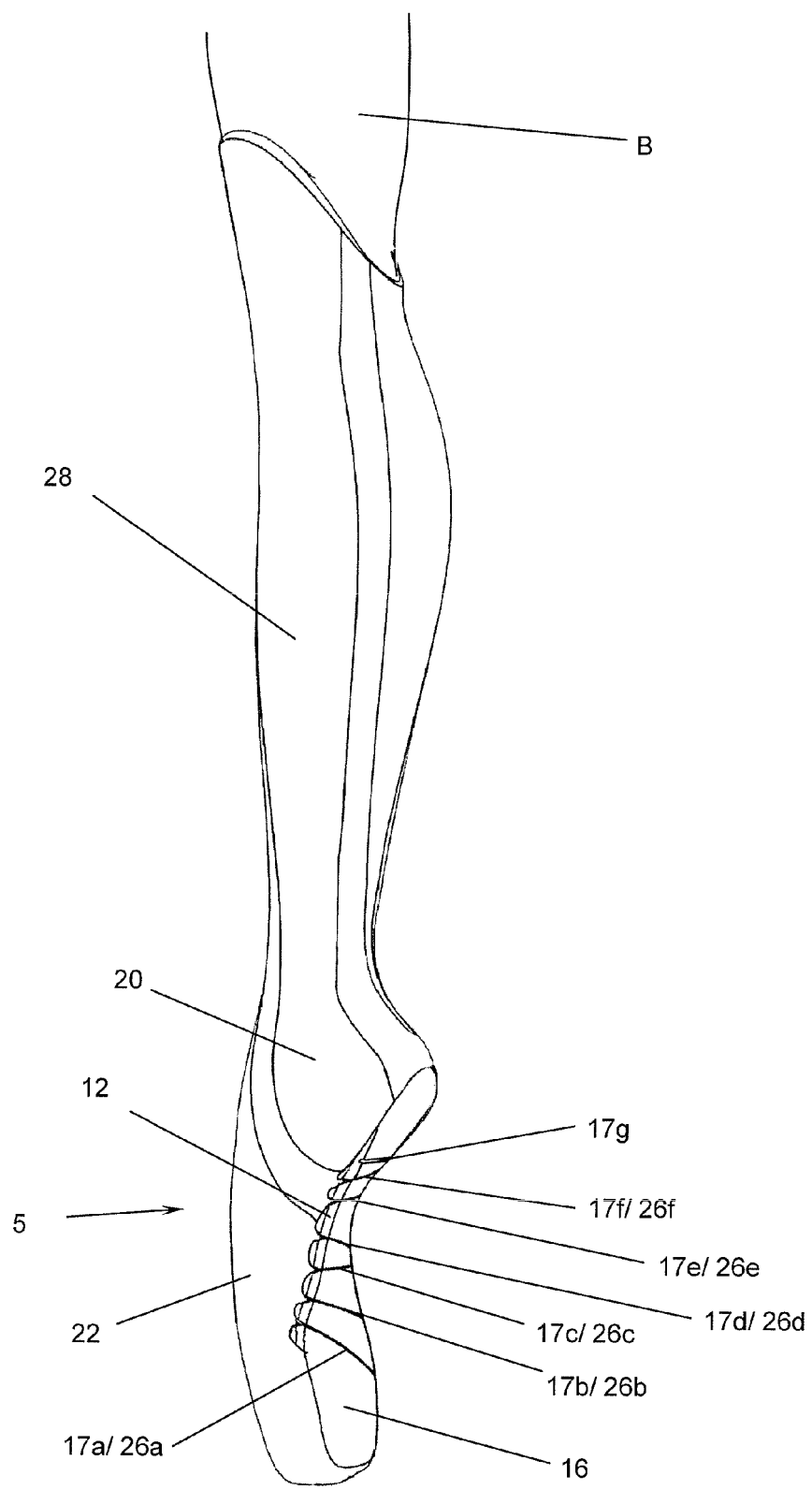
Figure 5:
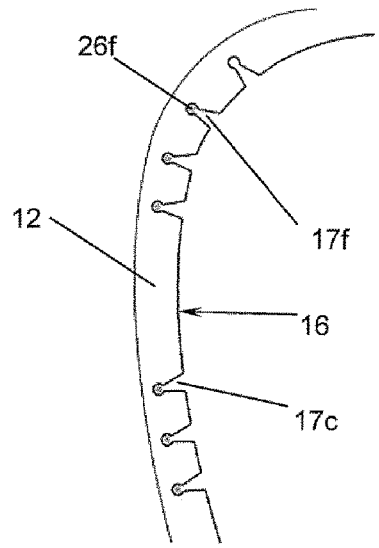
Figure 6:
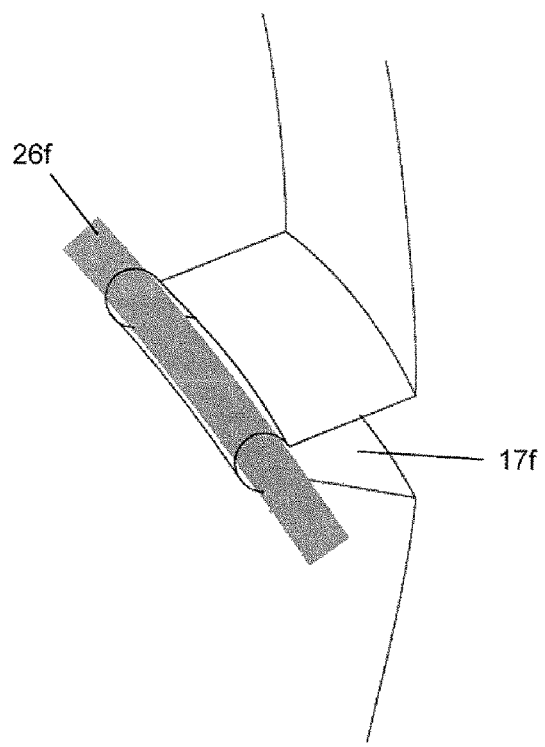
Figure 7:
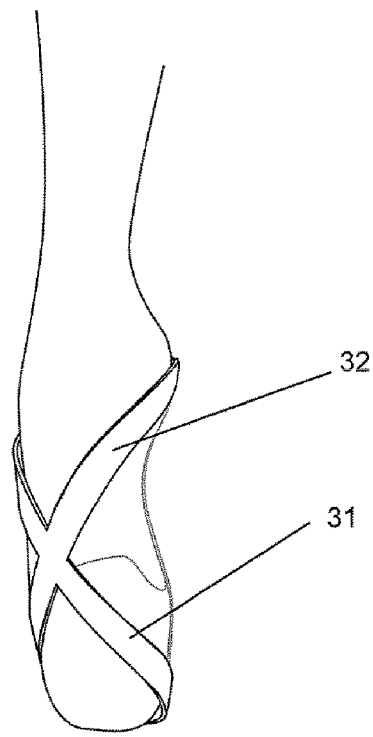

The invention is described in more detail in the following with the aid of a preferred example and reference to the Figures, showing in:

FIG. 1 A sole/toe unit for a dance shoe;

FIG. 2 The sole/toe unit from FIG. 1, as seen from a different viewing angle;

FIG. 3 An upper shoe to be attached to the sole/toe unit shown in FIGS. 1 and 2;

FIG. 4 A complete dance shoe being worn, consisting of the sole/toe unit according to FIGS. 1 and 2, the upper shoe according to FIG. 3 and, if applicable, a non-depicted toe-protection insert;

FIG. 5 A schematic section through the sole of the dance shoe in FIG. 4;

FIG. 6 A detail of the drawing in FIG. 5, shown in a schematic, perspective representation;

FIG. 7 A sole/toe unit and two crossed-over tie straps arranged thereon; and

Figure 8:
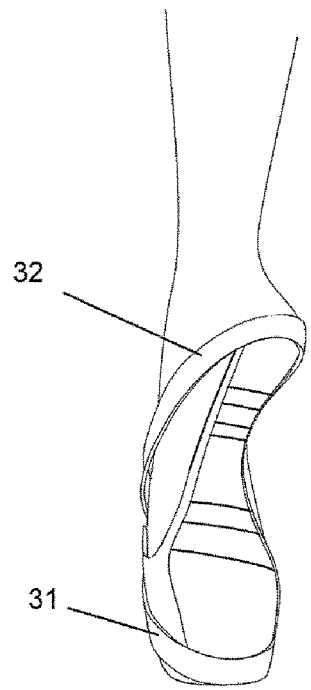

FIG. 8 The representation shown in FIG. 7, but seen from a different viewing angle.

The invention is described in further detail below with the aid of an exemplary embodiment of an inventive ballet shoe for the pointe dance. This shoe comprises a sole 12, a toe unit 18 and an upper shoe 20. The sole 12 and the toe unit 18 are produced integrally and form the sole/toe unit 10. As a rule, the toe unit contains a toe-protection insert (not shown). We want to mention at this point that for other embodiments of the invention, which do not require a dimensionally stable toe box, an inventive shoe can also consist only of sole and upper shoe, or of upper shoe and sole/toe unit with a small, formed-on toe unit. Furthermore, the sole could also be pulled up somewhat on the sides, so that it surrounds the sole on the foot of the male/female dancer to some degree.

The embodiment of the inventive dance shoe as described thus consists of at least two individual elements, namely a sole/toe unit 10 and an upper shoe 20. As mentioned, a toe-protection insert can also be provided inside the toe unit of the sole/toe unit, if applicable. The sole/toe unit 10 is initially described further with reference to FIGS. 1 and 2.

This sole/toe unit 10 has two functional segments, namely the sole 12 and the toe unit 18. The toe unit 18 for the described, preferred embodiment is formed integrally onto the sole 12, so that the two elements have a material to material connection. The sole/toe unit 10 can be composed totally or partially of a synthetic material and can be produced, for example, with the injection-molding technique or also with a 3D printing method. Insofar as the sole/toe unit is composed in part of a synthetic material, it frequently may be preferable to work reinforcements in the form of fibers (e.g. carbon or glass fibers, but also natural material fibers) integrally into the sole/toe unit. Insofar as the fibers are to be oriented, it may be useful to provide fibers extending lengthwise and/or transverse to the longitudinal extension of the sole/toe unit, depending on the required profile. The sole/toe unit 10 can be produced in standard sizes or can be tailored individually to a male/female dancer. Suitable synthetic materials for the sole/toe unit are, for example, thermoplastic-processed polyurethanes (TPU), thermoplastic elastomers (TPE) and polyamides (PA).

The sole 12 extends in longitudinal direction from a back end 12a to a front end 12b and has an inside 14 (meaning the side pointing to the foot sole when the shoe is worn) and an outside 16. The outside 16 contains a plurality of incisions 17a-17g which are embodied for the example as grooves 17a-17g that extend over the total width of the sole 12. These grooves 17a-17g expand on their inside ends, so that they are essentially key-shaped (see also FIGS. 5 and 6). In most cases, the incisions are advantageously formed in this way, but other patterns, arrangements, or cross-sectional shapes are also conceivable. Of course, the number of incisions are not restricted to 7 and more or fewer such incisions can also be provided. Depending on the production method used, the number, position and orientation of the incisions embodied herein as grooves can also be adapted to the foot of the individual male/female dancer. The grooves 17a to 17g have two functions: on the one hand they give the sole 12 a defined flexibility and this defined flexibility is unidirectional. In FIG. 1, the sole can be bent relatively strongly in arrow direction since the grooves are expanding while the sole "resists" in the opposite direction as soon as the grooves are "closed." On the other hand, the grooves function to attach the upper shoe, as will be shown later on. It must be considered here that not all grooves must also be used to attach the upper shoe. In the depicted example, the groove 17g is not used for attaching the upper shoe.

A toe-protection insert of a softer material, e.g. silicone, can additionally be arranged in the toe unit (not shown herein). This insert can be adapted individually to the front foot section of the male/female dancer.

The upper shoe 20, intended to be attached to the above-described sole/toe unit, is now described further with the aid of FIG. 3.

FIG. 3 shows an upper shoe 20 to be attached to the sole/toe unit 10. The upper shoe 20 of the depicted embodiment is essentially shaped like a stocking and consequently has a foot section 22 and a leg section 28. The foot section 22 is provided with a recess 24 in the sole region which, for the exemplary embodiment shown, extends substantially over the total region of the sole and contains web-type connecting elements 26a to 26f that extend essentially transverse to the longitudinal direction. The term "transverse" here need not necessarily mean "perpendicular," as can also be seen in FIG. 3. However, an orientation that is substantially perpendicular to the longitudinal direction is frequently preferred. These connecting elements 26a to 26f are arranged and dimensioned such (as will be shown later on) that they extend through grooves 17a to 17f in the sole 12 once the dance shoe is assembled.

The upper shoe 20 is a textile element which, for example, can be knitted, crochet or woven either totally or in part. The stocking-type upper shoe preferably is composed at least in some sections of an elastic material, for example of a mixture of cotton fibers and elastane or spandex. Other suitable materials are, for example, polyamide and polyester.

FIG. 3 furthermore shows that the upper shoe 20 contains first regions 20a and reinforced regions 20b. The reinforced regions 20b here have a lower elasticity than the first regions 20a. The reinforced regions 20b can be produced separately and can then be combined with a basic body of the upper shoe 20, which initially consists only of a first region 20a. However, as a rule it is preferable to produce the first regions 20a and the reinforced regions 20b directly as one piece, meaning integrally, using corresponding knitting or weaving techniques. Reinforcing material can additionally also be applied. Corresponding techniques are known, for example, from the sector for athletic clothing. The reinforced regions 20b in particular function to offer more support for especially stressed regions and/or to purposely support or stimulate specific muscle groups. The reinforced regions can also be embodied in the form of a tape which stimulates the muscular system. It can be useful to coat the reinforced regions 20b on the inside with silicone, so that they adhere to the skin.

As shown, it is advantageous if at least one reinforced region 20b extends over the front foot and if, starting from the edge of the recess 24, at least one reinforced region 20b extends to the upper end of the leg section 28 (insofar as it exists, as shown in the exemplary embodiment). It is especially advantageous if the leg section 28 is embodied long enough to extend around the calf of the male/female dancer when the shoe is worn.

FIG. 4 shows a dance shoe 5, worn by a male/female dancer, which consists of the sole/toe unit 10 and the upper shoe 20. Putting on this dance shoe 5 takes place as follows:

The sole/toe unit 10 is first fitted onto the foot in such a way that the toes of the male/female dancer are located in the toe unit 18 and the inside 14 of the sole fits against the bottom of the foot. Following this, the upper shoe 20 is pulled in the manner of a stocking over the foot and the sole/toe unit, wherein the "final state" generally is reached when the leg section 28 has been pulled over the calf. Insofar as the connecting elements 26a to 26f do not slip automatically into the grooves 17a to 17g, they must be inserted by hand if applicable (see also FIGS. 5 and 6). The above-described cross-sectional shape of the grooves improves the hold of the connecting elements in the grooves. In this state, the dance shoe 5 can then be used immediately. A further tying of ties or the like, as is necessary for traditional ballet shoes, is not required for the example described so far, but additional ties or straps can be provided to further stabilize the foot. For example, as shown in FIGS. 7 and 8, a type of "cross strap" with two straps for pulling tight can also be provided.

This cross strap comprises two tie straps 31, 32, wherein the first tie strap extends from the left front foot side to the right heel side and the second tie strap 32 extends from the right front foot side to the left heel side. Thus, each tie strap 31, 32 extends from a front end to a back end. The two tie straps thus extend across the instep, so as to cross thereon. The tie straps 31, 32 can be segments of a one-piece element (as shown), or they can be produced as individual tie straps. In the form of a one-piece embodiment, the one-piece layout preferably forms a closed figure "8" (see FIG. 8), meaning the front and the back ends of the tie straps merge. The tie straps 31, 32 advantageously are connected to the sole/toe unit 10 (i.e., a sole-toe unit), namely to the front end and the back end of the sole/toe unit 10. Since the two tie straps should be under tension when in use, they are preferably made of a non-elastic material. It is furthermore preferred if at least one of the two connections is not permanent, so that the tension can be adjusted. A Velcro closure, for example, is suitable for this. Once the upper shoe is fitted on, the two tie straps 31, 32 are located at least in some sections but as a rule completely between the sole/toe unit 10 and the upper shoe. In the state where the shoe is worn and correctly adjusted, the cross strap generates compression when the instep of the foot pushes against the cross strap during the pointe position. As a result, the bending of the sole is limited further, thereby providing additional support for the male/female dancer.

Separate tie straps that are integrated into the upper shoe can additionally or alternatively also be provided, or the cross strap could be integrated into the upper shoe (not shown).

In particular, the sole/toe unit and a possibly provided toe-protection insert can be produced so as to be individually adapted to the male/female dancer. For this, the feet can be scanned with a 3D scanner and the above-mentioned parts can be produced according to the resulting data set.

LIST OF REFERENCE NUMBERS AND SIGNS 5 dance shoe
10 sole/toe unit
12 sole
12a back end
12b front end
14 inside
16 outside
17a-g groove
18 toe unit
20 upper shoe
20a first region
20b reinforced region
22 foot section
24 recess
26a-f connecting element
28 leg section
31 first tie strap
32 second tie strap
B leg

The invention claimed is:

1. A dance shoe, comprising:
a sole having an inside that is a foot-facing side and an outside that is a ground-facing side, and extending in a longitudinal direction from a back end to a front end,
a toe unit fixed at least to the front end of the sole, to thereby form a sole-toe unit together with the sole, a frontmost portion of the toe unit being connected to the front end of the sole to form a first layer at a frontmost end of the dance shoe for covering tips of toes of a wearer of the dance shoe, and
an upper shoe having a foot section, wherein
the outside of the sole comprises a plurality of incisions,
the foot section has, on an underside thereof, at least one recess through which elongated connecting elements extend, such that when the dance shoe is worn, the connecting elements are accommodated at least sectionally in the incisions on the outside of the sole,
the foot section covers the entire frontmost portion of the toe unit, to form a second layer at the frontmost end of the dance shoe for covering the tips of the toes of a wearer of the dance shoe, and
the toe unit is so shaped that a foot-facing side thereof covers a front and a top of the toes, but not an instep, of the wearer, and an outside of the toe unit, opposite to the foot-facing side thereof, is covered by the foot section, such that the foot section is directly contactable with the instep of the wearer.

2. The dance shoe according to claim 1, wherein the upper shoe takes the form of a stocking and, in addition to the foot section, comprises a leg section extending from the foot section, wherein the underside of the foot section is located opposite the leg section.

3. The dance shoe according to claim 2, wherein the leg section of the upper shoe has a length of at least 15 cm.

4. The dance shoe according to claim 3, wherein the leg section of the dance shoe is so configured as to be worn along a complete calf of the wearer.

5. The dance shoe according to claim 1, wherein each of the connecting elements is accommodated in precisely one of the incisions.

6. The dance shoe according to claim 1, wherein the incisions are embodied as grooves extending transverse to the longitudinal direction which comprise an inner end with an enlarged cross section.

7. The dance shoe according to claim 6, wherein the grooves respectively extend over the complete width of the sole.

8. The dance shoe according to claim 1, wherein the upper shoe is composed of a textile material and is knitted or woven.

9. The dance shoe according to claim 1, wherein the upper shoe comprises at least a first region and at least one region that is reinforced as compared to the first region.

10. The dance shoe according to claim 9, wherein:
the at least one reinforced region is so configured as to span a front foot of the wearer when the dance shoe is worn.

11. The dance shoe according to claim 2, further comprising:
at least one reinforced region that is so configured as to extend along a calf of the wearer when the dance shoe is worn.

12. The dance shoe according to claim 1, wherein the upper shoe is elastic, at least in some sections thereof.

13. The dance shoe according to claim 1, wherein the sole is composed of a fiber-reinforced synthetic material.

14. The dance shoe according to claim 13, wherein the fiber-reinforced synthetic material includes fibers oriented in a specified direction.

15. The dance shoe according to claim 14, wherein the fibers are oriented in the longitudinal direction of the sole.

16. The dance shoe according to claim 14, wherein the fibers are oriented in a transverse direction of the sole.

17. The dance shoe according to claim 1, further comprising:
a first tie strap extending from a front left end region to a right back end region of the dance shoe, and
a second tie strap extending from the right front end region to the left back end region of the dance shoe, wherein
the first and second tie straps are configured to cross each other over an instep of a foot of the wearer when the dance shoe is worn.

18. The dance shoe according to claim 17, wherein ends of the first and second tie straps are connected or connectable to the sole.

19. The dance shoe according to claim 17, wherein the first and second tie straps form components of an integral tension element which forms a number eight.

20. The dance shoe according to claim 17, wherein the first and second tie straps are arranged at least partially between the sole and the upper shoe.

21. The dance shoe according to claim 1, wherein the toe unit is formed integrally with the sole.

22. The dance shoe according to claim 1, further comprising:
a toe-protection insert made of silicone, arranged in the toe unit.

23. The dance shoe according to claim 1, wherein the first layer is on a foot-facing side of the second layer.

24. A kit for assembling a dance shoe, comprising:
a sole having an inside that is a foot-facing side and an outside that is a ground-facing side, and extending in a longitudinal direction from a back end to a front end, the sole having, on the ground-facing side thereof, a plurality of incisions;
a toe unit fixed at least to the front end of the sole for forming a sole-toe unit together with the sole, a frontmost portion of the toe unit being connected to the front end of the sole to form a first layer at a frontmost end of the dance shoe for covering tips of toes of a wearer of the dance shoe; and
an upper shoe having a foot section, wherein
the foot section has, on an underside thereof, at least one recess through which elongated connecting elements extend, such that when the dance shoe is worn, the connecting elements are accommodated at least sectionally in the incisions on the outside of the sole,
the foot section is configured to be positionable to cover the entire frontmost portion of the toe unit, to form a second layer at the frontmost end of the dance shoe, for covering the tips of the toes of the wearer, and
the toe unit is so shaped that a foot-facing side thereof covers a front and a top of the toes, but not an instep, of the wearer, and an outside of the toe unit, opposite to the foot-facing side thereof, is covered by the foot section, such that the foot section is directly contactable with the instep of the wearer.

* * * * *